United States Patent
Komori et al.

[11] Patent Number: 5,990,422
[45] Date of Patent: Nov. 23, 1999

[54] APPARATUS FOR MEASURING WEIGHT AND LENGTH OF ARTICLE

[75] Inventors: Susumu Komori; Sakae Kakinuma; Masaaki Kobayashi, all of Tokyo, Japan

[73] Assignee: Shinko Denshi Company Limited, Tokyo, Japan

[21] Appl. No.: 08/951,676

[22] Filed: Oct. 16, 1997

[30] Foreign Application Priority Data

Oct. 18, 1996 [JP] Japan ..................................... 8-297513
Sep. 9, 1997 [JP] Japan ..................................... 9-260982

[51] Int. Cl.⁶ ................................................. G01G 21/00
[52] U.S. Cl. ....................... 177/25.11; 177/145; 177/119
[58] Field of Search ..................... 177/119, 145, 177/199, 200, 50, 25.18, 25.11, 25.12, 25.13, 25.14

[56] References Cited

U.S. PATENT DOCUMENTS

| | | | |
|---|---|---|---|
| 4,709,770 | 12/1987 | Kohashi et al. | 177/50 |
| 4,794,996 | 1/1989 | Wallace et al. | 177/50 |
| 5,109,936 | 5/1992 | Ruppel | 177/50 |
| 5,596,179 | 1/1997 | Sakaeda | 177/25.18 |
| 5,635,679 | 6/1997 | Kohashi et al. | 177/145 |
| 5,814,772 | 9/1998 | Nishimura et al. | 177/25.13 |

*Primary Examiner*—Randy W. Gibson
*Attorney, Agent, or Firm*—Varndell & Varndell, PLLC

[57] ABSTRACT

An apparatus for measuring weights of articles having different shapes and weights successively transported on a conveyer including first and second weighing conveyers 13 and 14 having load cells 23 and 24 to produce weight signals and photo-sensors 20, 21 and 22 arranged at inlets and outlets of the weighing conveyers 13 and 14 for detecting passage of the articles to produce article detection signals. In a calculating circuit 25, a weigh of an article is calculated by processing weight signals supplied from the first and second weighing conveyers 13 and 14 in accordance with a measuring sequence which is selected from a plurality of measuring sequences in accordance with the article detection signals supplied from the photo-sensors 20, 21 and 22.

A length of an article is measured by detecting a difference ($x-y$) between a length of an article and a reference length $Lx$ by which the photo-sensors 20 and 21 are separated from each other by counting output pulses from rotary encoder 15 detecting a rotation angle of driving rollers 11, and calculating a sum of the reference length and said difference ($x-y$).

15 Claims, 4 Drawing Sheets

APPARATUS FOR MEASURING WEIGHT AND LENGTH OF ARTICLE

BACKGROUND OF THE INVENTION

1. Field of the Invention

The present invention relates to an apparatus for measuring weights of articles which have various configurations and are successively transported into a measuring area, and also relates to an apparatus for measuring weights and lengths of articles having various configurations and being successively transported into measuring area.

2. Related Art Statement

It is rather difficult to measure weights and lengths of articles having various shapes, which are successively transported on a belt conveyer into a measuring area in such a manner that distances between successive articles are very small, without stopping the belt conveyer.

Heretofore, a weighing conveyer having a high response is generally used to measure weights of articles successively fed along a belt conveyer. Since such a weighing conveyer has been well known in the high speed automatic weighing technique, its detailed explanation is dispensed with.

Now a known weight measuring apparatus using a weighing conveyer having a single weighing range will be explained with reference to numerical examples.

FIG. 1 is a schematic view showing a known weighing apparatus for measuring weights of relatively long articles. An article A whose weight is to be measured is transported from an input side conveyer 1 into a weighing conveyer 2 having a length D=80 cm, and after measurement the article A is transported onto an output side conveyer 3. At a front edge of the weighing conveyer 2 is arranged a photo-sensor 4 in the form of a photo-interrupter. When the article is transported from the input side conveyer 1 onto the weighing conveyer 2 and a rear end of the article A passes through the photo-sensor 4, the photo-sensor generates an edge detection signal. For a time interval during which the article A is transported over a predetermined minimum distance S such as 10 cm after the generation of the edge detection signal, the weighing conveyer 2 performs the weighing operation. Said minimum distance S is required for measuring a weight of an article. In this manner, a weight of the article A can be measured correctly. However, if a length L of the article A is larger than 70 cm, the weighing conveyer 2 measures a weight of the article in such a condition that a front portion of the article A is placed on the output side conveyer 3. It is apparent that a weight of the article A could not be measured correctly under such a condition.

FIG. 2 is a schematic view of another known weighing apparatus which is usually used in measurement of relatively short articles. A basic conception of this known weighing apparatus is substantially identical with that of the apparatus shown in FIG. 1. In this apparatus, in order to measure a weight of an article A, a preceding article A' should be completely placed removed from the weighing conveyer 2. To this end, a second photo-sensor 5 is arranged at a rear end of the weighing conveyer 2. Then, a measured value obtained by the weighing conveyer 2 after the second photo-sensor 5 has detected the rear edge of the preceding article A' is adopted as a final measured value. Therefore, when a space G between successive articles A', A and A" is 35 cm and a length L of articles is smaller than 20 cm, two articles might be simultaneously placed on the weighing conveyer 2. Similarly, when a space G is 25 cm and a length L of articles is smaller than 40 cm, two successive articles might be placed on the weighing conveyer 2. In such cases, weights of articles could never be measured correctly.

Now a maximum length $L_{max}$ of the article A which can be measured correctly by the weighing conveyer 4 in the apparatuses shown in FIGS. 1 and 2 will be considered. In FIG. 1, in order to measure a weight of the article A under such a condition that the preceding article A' or succeeding article A" is not placed on the weighing conveyer 2 together with the article A so that the correct measurement can be carried out, that is to say, a space G between successive articles is not less than the minimum travelling distance S which is necessary for measuring a weight of articles accurately, the measurement has to be carried out during a time interval in which a front end of the article A travels over a portion 10 cm of the weighing conveyer 2, said portion being indicated by a thick arrow S. Then, as can be understood from FIG. 1, the maximum length $L_{max}$ of the article A can be given by the following equation (1):

$$L_{max}=D-S \qquad (1)$$

In this case, a space G between successive articles may be set to an arbitrary value which satisfies the condition $G \geq S$. Therefore, the maximum length $L_{max}$ of the article A is determined by the effective length D of the weighing conveyer 2 and the effective minimum distance S. In this manner, in the apparatus shown in FIG. 1, the maximum length $L_{max}$ of the article A can be calculated as follows:

$$L_{max}=80 \text{ cm}-10 \text{ cm}=70 \text{ cm}$$

Now a minimum length $L_{min}$ of the article A will be determined. As illustrated in FIG. 2, the minimum length $L_{min}$ of the article A is greatly dependent upon the space G between successive articles and can be expressed by the following equation (2):

$$L_{min}=D+S-2G \qquad (2)$$

For instance, when the space G between successive articles is 35 cm, the length D of the weighing conveyer 2 is 80 cm and the minimum distance S is 10 cm, the minimum length $L_{min}$ of the article A becomes 20 cm.

As stated above, the minimum length $L_{min}$ of the article A is affected by the space G between successive articles, and when the space G is large, a smaller article can be measured. However, in such a case, the number of articles which can be measured within a unit time becomes smaller and a measuring efficiency is decreased. It should be noted that if a space between the relevant article A and preceding articles A' differs from a space between the relevant article A and the succeeding article A", a smaller distance G is adopted in the equation (2).

By applying actual values of the article length L, minimum distance S and space G in the above equations (1) and (2), a measurable range with respect to the article length L and space G can be obtained diagrammatically. FIG. 3 is a diagram showing such a measurable range when the length D of the weighing conveyer 2 is set to 80 cm and the minimum travelling distance S is to 10 cm. It should be noted that the space G is set to be not less than 10 cm. In FIG. 3, a hatched area denotes the measurable range.

For instance, when the space G between successively transported articles on the conveyer is set to 25 cm, lengths of articles whose weights can be measured correctly is limited to a range from 40 cm to 70 cm as can be seen from a line a in FIG. 3. That is to say, an article having a length more than 70 cm or smaller than 40 cm could not be measured correctly. When articles have a predetermined length L of 25 cm, then a space G has to be set to a value not less than 32.5 cm as indicated by a line b in FIG. 3.

Actual values of the above mentioned parameters may be varied to some extent. Particularly, when parameters such as the length D of the weighing conveyer 2, minimum distance S, space G between successive articles and length L of articles are changed, the basic property of the weighing apparatus is not changed at all.

Width and height of a rectangular freight such as a cardboard box can be measured relatively easily by means of an optical measuring apparatus irrespective of a fact that the article is stopped or moved. However, a length of a moving article, i.e. a dimension of the article in a direction of the movement could not be easily measured.

In general, an ability of a high speed weighing apparatus or high speed article selecting apparatus is expressed by the number of articles which could be handled within a unit time. Therefore, also in the present specification, the number of handled articles within a unit time is adopted as a standard for judging the operation ability of the weighing apparatus.

The performance of the weighing apparatus can be improved by increasing the travelling speed or decreasing a pitch of articles (center distance or length L of article+space G). Since the present invention does not relates to the technique for performing the weight measurement at a high speed transportation, a relation between the performance of the weighing apparatus and the geometric condition of the article length L and space G will be considered.

By using the numerical examples explained above with reference to the known weighing apparatuses shown in FIGS. 1 and 2, the performance will be obtained in the following table when the transporting speed is set to 100 cm/sec. In this table, an inverse of the performance corresponds to the pitch P (cm), and the pitch P is a sum of the article length L and space G between successive articles. Even when the article length L is decreased to a half thereof, the performance is not increased twice, but an increment of the performance is at most 30%.

TABLE

| L | G | P | performance |
|---|---|---|---|
| 10 | 40 | 50 | 2.00 |
| 20 | 35 | 55 | 1.82 |
| 30 | 30 | 60 | 1.67 |
| 40 | 26 | 65 | 1.54 |
| 50 | 20 | 70 | 1.43 |
| 60 | 15 | 76 | 1.33 |
| 70 | 10 | 80 | 1.25 |

L article length (cm)
G minimum space (cm)
p minimum pitch (cm)

As can be seen from the above table, in the known weighting apparatuses using a single weighing conveyer 2, when the space G between successively transported articles is set to a small value for attaining a higher performance, the length L of articles which can be measured correctly is limited to a relatively large value. That is to say, in such a condition, two articles having a small length might be placed on the weighing conveyer 2 simultaneously and thus could not be measured correctly. On the other hand, when the space G is set to a relatively large value in order to measure articles having smaller length L, the performance of the weighing apparatus is decreased.

Moreover, it is technically very difficult to measure a length of an article as well as its weight while the article is continuously transported on the conveyer.

SUMMARY OF THE INVENTION

The present invention has for its object to provide a novel and useful weighing apparatus, which can mitigate the above mentioned problems of the known weighing apparatuses and can measure weights of articles having various configuration with a high performance.

According to the invention, an apparatus for measuring weights of articles comprises:

a conveying means for transporting articles successively and including a plurality of weighing conveyers for measuring weights of articles successively transported thereon to produce a plurality of weight signals; and a calculating means for receiving the weight signals supplied from said plurality of weighing conveyers and calculating a weight of each of articles by processing said weight signals in accordance with a predetermined algorithm.

The present invention also relates to an apparatus for measuring weights and lengths of articles which can measure correctly not only weights but also lengths of articles successively transported along a conveyer.

According to the invention, an apparatus for measuring weights and lengths of articles comprises:

a conveying means for transporting articles successively along a transporting path and including a plurality of weighing conveyers arranged adjacently in series with the transporting path for measuring weights of articles successively transported thereon to produce a plurality of weight signals;

a first calculating means for receiving the weight signals supplied from said plurality of weighing conveyers and calculating a weight of each of articles from said weight signals;

at least two detectors arranged with a predetermined reference length along said transporting path for detecting a passage of successive articles to produce article detection signals;

a rotation angle detector for detecting rotation angles of driving rollers provided in said plurality of weighing conveyers and deriving a length signal representing a difference between a length of an article and said reference length under the control of said article detection signals; and a second calculating means for receiving said length signals supplied from said rotation angle detector and calculating a length of each of the articles from a sum of said reference length and said difference between a length of the article and said reference length.

EXPLANATION OF THE PREFERABLE EMBODIMENTS

Figure 1:
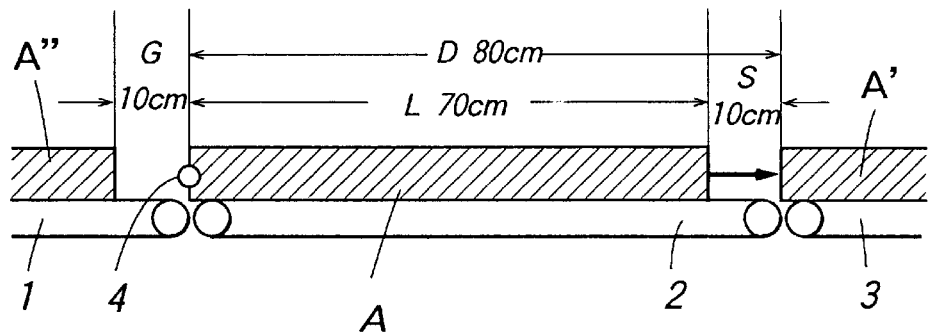
FIG. 1 is a schematic view showing a known weighing apparatus having a single weighing conveyer.
Figure 2:
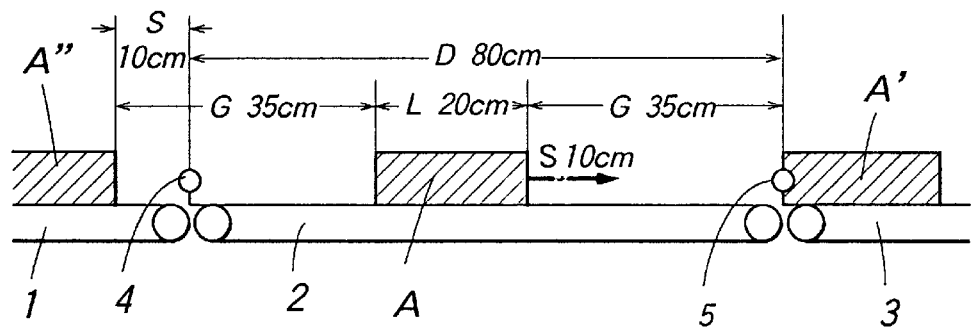
FIG. 2 is a schematic view illustrating another known weighing apparatus having a single weighing conveyer.
Figure 3:
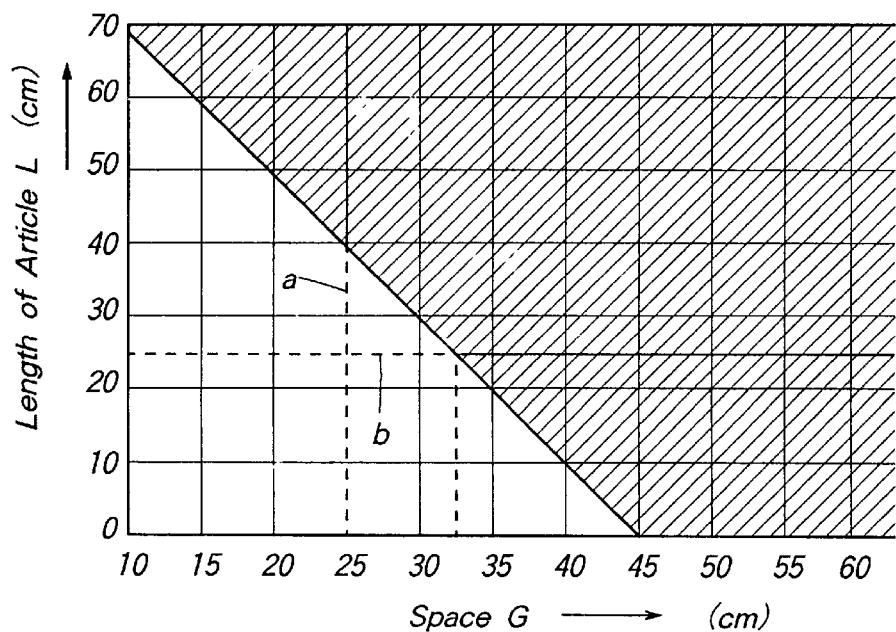
FIG. 3 is a graph representing a relation between the space between successively transported articles and the length of articles in the known weighing apparatuses.
Figure 4:
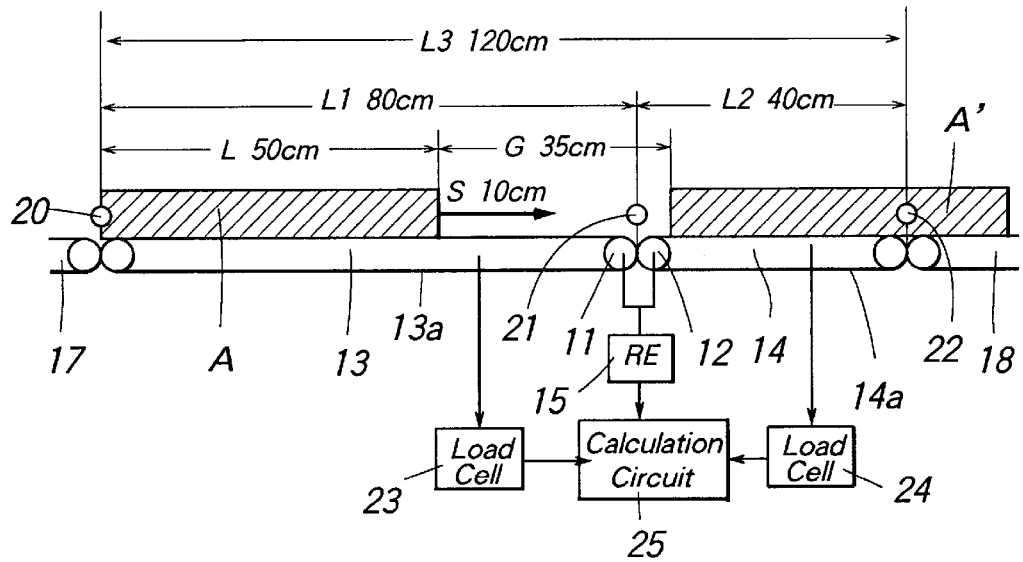
FIG. 4 is a schematic view depicting an embodiment of the weighing apparatus according to the invention.

FIG. 4 is a schematic view showing an embodiment of the weighing apparatus according to the invention. The weighing apparatus comprises first and second weighing conveyers 13 and 14 including conveyer belts 13a and 14a driven by driving rollers 11 and 12, respectively and load cells 23 and 24. The first and second weighing conveyers 13 and 14 have different lengths and are arranged successively in series with input and output side conveyers 17 and 18 to constitute a article transporting path. The driving rollers 11 and 1 are driven by motors not shown, and the rotation angle of these driving rollers is detected by a rotary encoder (RE) 15.

Optical sensors of photo-interrupter type 20, 21 and 22 are arranged at front position of the first weighing conveyer 13, at a boundary position between the first and second weighing conveyers 13 and 14 and a rear position of the second weighing conveyer 14, respectively. These optical sensors 20, 21 and 22 detect a passage of an article A whose weight is to be measured to produce timing signals, which are supplied to a calculation circuit 25 to which are also supplied weight detection signals generated by the load cells 23 and 24. In the calculation circuit 25, the weight detection signals are processed in accordance with a given sequence to derive a weight of the article A.

Now the operation of the calculation circuit 25 will be explained. In the calculation circuit 25, one of the following sequences (1) to (3) is automatically selected on the basis of the timing signals supplied from the optical sensors 20, 21 and 22, and a weight of the article A is calculated in an efficient manner.

(1) An article having an intermediate length is measured by the first weighing conveyer 13 having the longer length L1.

(2) An article having a small length is measured by the second weighing conveyer having the smaller length L2.

(3) An article having a large length is measured by a sum of weight signals supplied by the first and second weighing conveyers.

For the sake of simplicity, it is now assumed that the first weighing conveyer 13 has a length L1 of 80 cm, and the second weighing conveyer 14 has a length L2 of 40 cm which is a half of the length L1 of the first weighing conveyer 13. FIG. 4 illustrates a condition in which the article A contained within a cardboard box having a middle length is measured. As stated above, the first weighing conveyer 13 has the length L1 of 80 cm, and thus when a space G between successive articles A' and A is set to not less than 30 cm, an article having a length within a range from 30 cm to 70 cm can be correctly measured solely by the first weighing conveyer 13.

In this case, a measuring sequence for determining a timing at which the weight detection signal generated by the load cell 23 of the first weighing conveyer 13 is taken out may be considered on the basis of various algorithms. Upon using any measuring sequence, it should be basically defined that after a rear edge of the article A is detected the photo-sensor 20, the effective minimum distance S=10 cm should be attained.

Figure 5:
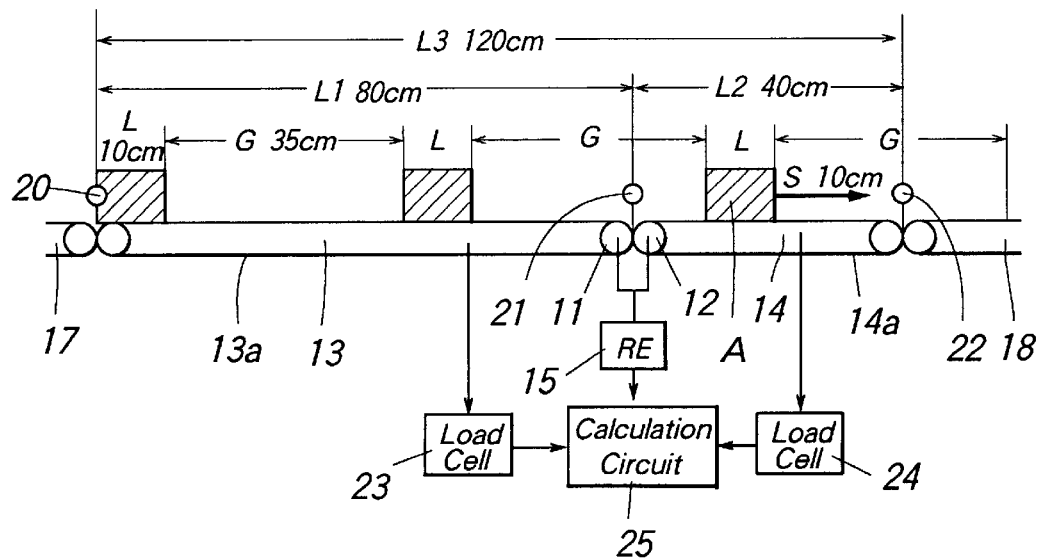
FIG. 5 is a schematic view showing a condition in which small articles are measured in the weighing apparatus shown in FIG. 4.

FIG. 5 shows a condition, in which an article A having a small length L. In this case, a space G between successive articles is set such that although more than one article may be placed simultaneously on the first weighing conveyer 13, more than one article is not placed on the second weighing conveyer 14 simultaneously. Then, it is possible to measure weights of articles having lengths not longer than 30 cm by processing the weight detection signal generated by the second load cell 24 of the second weighing conveyer 14.

Figure 6:
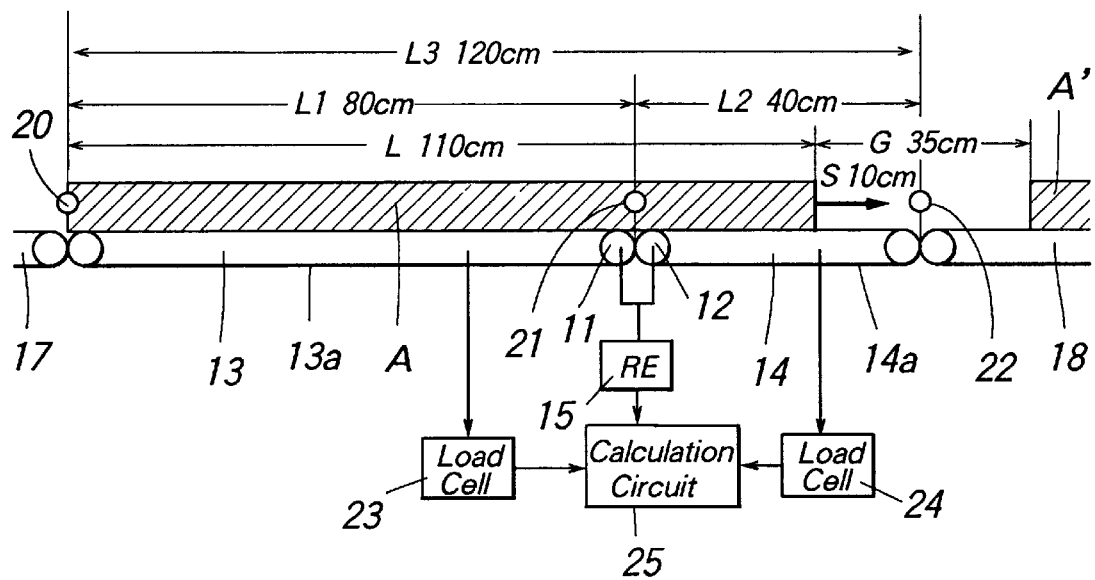
FIG. 6 is a schematic view representing a condition in which large articles are measured in the weighing apparatus of FIG. 4.

FIG. 6 illustrates a case in which an article A having a longer length L is measured by the weighing apparatus of the present embodiment. That is to say, weights of articles having lengths within a range from 70 cm to 110 cm can be measured correctly as a sum of weights measured by the first and second weighing conveyers 13 and 14.

According to the invention, how to measure weights of successively transported articles is determined by processing the output signals from the photo-sensors 20, 21 and 22 and durations of the weight detection signals supplied from the weighing conveyers 13 and 14 in accordance with a given algorithm. As long as spaces G between successive articles are set within a given range, the articles can be weighed correctly even if articles having different lengths are transported in a mixed manner.

It should be noted that in the present embodiment, the articles may be measured by any method other than that defined by the above mentioned three steps (1)–(3) by changing the algorithm. When successive articles are transported on the conveyer with sufficiently large spaces G, for instance an article having a middle length may be measured by processing the weight detection signal generated not only by the first weighing conveyer 13, but also by the second weighing conveyer 14, and an article having a small length may be measured only by processing the weight detection signal from the first weighing conveyer 13 or by processing the weight detection signals supplied from both the first and second weighing conveyers 13 and 14. Then, a shorter article is measured several times, and thus a more accurate weight of the article can be derived by averaging a plurality of weight values.

In the present embodiment, the two weighing conveyers having different lengths L1 and L2 are provided, but according to the invention, two weighing conveyers having a same length may be arranged serially. In this case, a measurable length of articles becomes narrower than the above explained embodiment, but the efficiency of the weighing apparatus is higher than the known weighing apparatus.

It should be further noted that according to the invention, more than two weighing conveyers having different or same lengths may be provided in series with each other. For instance, three weighing conveyers having lengths of 50 cm, 40 cm and 30 cm, respectively may be arranged serially in this order. Then, combined lengths of the weighing conveyers becomes 30 cm, 40 cm, 50 cm, 70 cm, 90 cm and 120 cm, and thus successive articles may be transported with smaller spaces G. Of course, in this case, the number of photo-sensors must be increased in accordance with the number of weighing conveyers. In case of providing the three weighing conveyers, four photo-detectors are arranged in a similar manner to that shown in FIG. 4.

When two weighing conveyers having different lengths are used, the order of arranging them serially may be arbitrary, but when three weighing conveyers having different lengths are provided, it is preferable to arrange them such that lengths are successively increasing or decreasing. When more than three weighing conveyers are used, they may be arranged arbitrarily by considering lengths of the weighing conveyers.

In case of measuring a length of an article A, a distance L1 between the photo-sensors 20 and 21 shown in FIG. 4 is used as a reference length. Now it is assumed that an article A having a length L which is identical with the reference length L1 is transported on the first weighing conveyer 13. In this case, when a rear edge of the article A is detected by the photo-sensor 20, a front edge of the same article A is just detected by the photo-sensor 21. Then, the length of the article A can be measured accurately on the basis of the reference length L1 instead of travelling speed and travelling time of the article on the weighing conveyer 13.

As illustrated in FIG. 6, now it is assumed that the article A having a length L which is slightly longer than the reference length L1 (L=L1+a) is passing over the first weighing conveyer 13. At first, the photo-sensor 20 detects a front edge of the article A, and then the photo-sensor 20 detects a rear edge of the article A after the article has transported over a distance Lx (see FIG. 6). When the photo-sensor detects the front edge of the article A, counting of the output pulses from the rotary encoder 15 is initiated. When the photo-sensor 20 detects the rear edge of the relevant article A, the counting operation is stopped. Then, a count value of the output pulses from the rotary encoder 15 represents the length La. As stated above, since a distance between the photo-sensors 20 and 21 is the reference length L1 a length L of the article A can be measured as a sum of the reference length L1 and the counted length Lx (L=L1+Lx). Since the reference length L1 is not affected by any measurement error, only the actually measured length Lx might include a measurement error, and thus a measurement error rate for a whole length is Lx/(L1+Lx).

The above explained basic measuring sequence can be applied to articles having length not smaller than the reference length L1, but could not be applied to articles having lengths shorter than the reference length L1 as shown in FIGS. 4 and 5.

Figure 7:
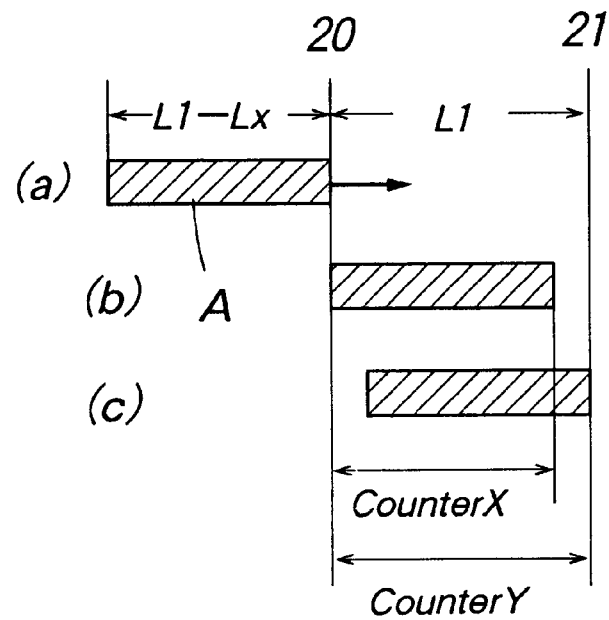
FIG. 7 is a diagram illustrating a sequence for measuring a length of an article according to the invention.
Figure 8:
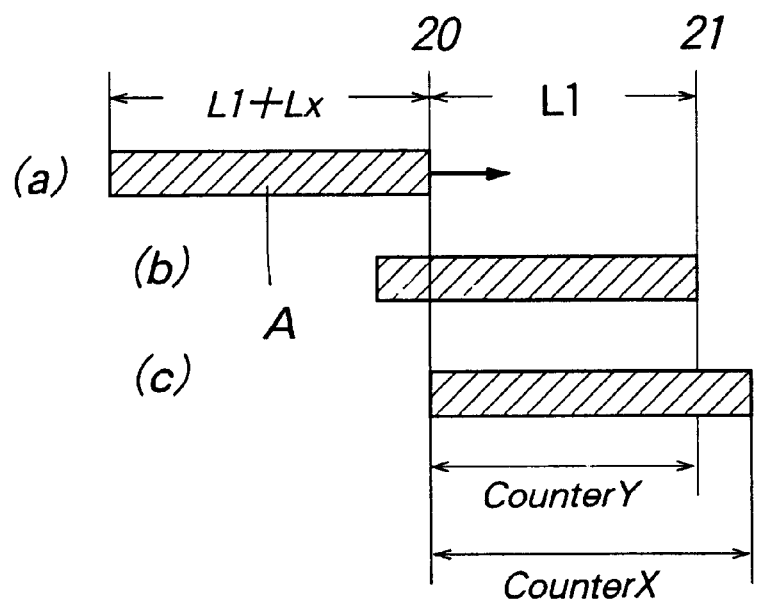
FIG. 8 is a diagram representing a sequence for measuring a length of an article according to the invention.

Now an embodiment of the measuring sequence which could be applied to articles having any lengths L will be explained with reference to FIGS. 7 and 8. FIG. 7 shows a case of L<L1 and FIG. 8 illustrates a case of L>L1. In both cases, the measurement of length is performed by the same sequence. In FIG. 7, (a) represents a timing at which a front edge of an article A is detected by the first photo-sensor 20, (b) depicts a timing at which a rear edge of the article A is detected by the first photo-sensor 20 and (c) illustrates a timing at which the front edge of article is detected by the second photo-sensor 21. In FIG. 8, (a) shows a timing at which a front edge of an article A is detected by the first photo-sensor 20, (b) illustrates a timing at which the front edge of the article A is detected by the second photo-sensor 21 and (c) depicts a timing at which the front edge of article is detected by the first photo-sensor 20. The output pulses generated by the rotary encoder 15 are counted by first and second counters X and Y. These counters X and Y operate in the following manner:

(1) When the front edge of the article A is detected by the first photo-sensor 20, the counters X and Y start to count the output pulses from zero count.
(2) When the first photo-sensor 20 detects the rear edge of the article A, the counter X is stopped.
(3) When the second photo-sensor 21 detects the front edge of the article A, the counter Y is stopped.
(4) In response to the counting stop of both counters X and Y, a length L of the article A is calculated from count values x and y of the counters X and Y by an equation of L=L1+(x−y).

In the conditions shown in FIGS. 7 and 8, the counter Y counts the output pulses corresponding to the reference length L1 and seems to be superfluous. However, this is not a case, which will be explained with reference to a numerical example. For instance, it is now assumed that the reference length L1 is 80 cm, the length of the article L=L1+Lx is 100 cm and the rotary encoder 15 has a span error of 2%. If the length L of the article A is measured by counting the output pulses by only the counter X, a measured length of 102 cm is obtained.

According to the invention, after the length Lx is calculated by deriving a difference between the counts x and y, and then a length L is calculated as a sum of the thus derived difference and the reference length L1. Since the count value y is also subjected to the span error of 2%, a length expressed by the count y becomes 81.6 cm. Therefore, Lx=102−81.6=20.4 cm is obtained. This means that the length Lx is measured with the span error of +2%. Then, a length L of the article is calculated from a sum of the reference length L1 and the calculated length Lx, i.e. L=80+20.4=100.4 cm. It is apparent that the length L of the article measured by the present invention contains an error of 0.2 cm, which is a fifth of the error of 2 cm in the length measured by counting the output pulses from the rotary encoder 15.

The reference length L1 may be given not only by the two photo-sensors 20 and 21 shown in FIG. 4, but also the photo-sensor 22. When three photo-sensors 20, 21 and 22 are used, three reference lengths L1, L2 and L3 may be defined as illustrated in FIG. 4. In this case, in addition to the counters X and Y, a third counter Z has to be provided. However, the measuring sequence is essentially identical with that explained above. In this case, it is preferable to use a combination of the reference lengths similar to the combination of (1)–(3) for measuring a weight of the article A.

In the weight and length measuring apparatus according to the invention including more than one photo-sensor, it is a common sequence to measure a distance between the front or rear edge of the article A and the nearest photo-sensor by means of the rotary encoder 15 at an instance at which a length of the article is roughly found, and a length of the article is determined as a sum of the thus detected distance and the reference length.

In the measuring apparatus according to the present invention, the accuracy of the measurement by means of the rotary encoder 15 can be improved. That is to say, the rotary encoder 15 has an error due to a secular variation. In the measuring apparatus according to the invention, this error can be simply compensated for. If it is assumed that an error of +2% is induced by a secular variation in the rotary encoder 15, the measured value becomes 81.2 cm as explained above. Then, this measured value is compared with the predetermined reference length of 80 cm to derive a correction factor, and the measured value is corrected in accordance with the correction factor into a correct value. The correction may be carried out mechanically or electrically. In this manner, the length Lx can be measured accurately, and thus a whole length of an article can be measured precisely.

In the embodiment so far explained, not only a weight of an article, but also a length of the article are measured, but according to the invention, the measurement of a length of an article may be dispensed with.

Moreover, the photo-sensor may be replaced by any other sensor such as ultrasonic sensor, proximity sensor, mechanical sensor and television camera. Further, the weighing conveyer may be constituted by other weighing conveyer comprising a number of rollers and a weight measuring element.

As explained above in detail, in the weight measuring apparatus according to the invention, a plurality of weighing conveyers are adjacently arranged in series with one another and a plurality of weight detection signals obtained by a single or plural weighing elements are combined in accordance with a given sequence to derive weights of successively transported articles in a correct and accurate manner. Therefore, not only a range in length of articles can be widened, but also the number of articles which can be treated within a unit time can be increased upon being compared with the known apparatuses comprising a single weighing conveyer.

Moreover, in the weight and length measuring apparatus according to the invention, in addition to the above mentioned merits, lengths of articles can be measured accurately.

What is claimed is:

1. An apparatus for measuring weights of articles comprising:
   a conveying means for transporting articles successively along a transporting path and including a plurality of weighing conveyers arranged adjacently in series with the transporting path for measuring weights of articles successively transported thereon to produce a plurality of weight signals; and
   a calculating means for receiving the weight signals supplied from said plurality of weighing conveyers and calculating a weight of each of articles by processing said weight signals in accordance with a predetermined algorithm, said calculating means detecting a length of an article by processing duration of the weight signals, selecting one or more weight signals in accordance with the detected length of the article, and calculating a weight of the article from the selected one or more weight signals.

2. An apparatus according to claim 1, wherein the apparatus further comprises an article detecting means for detecting successively transported articles to produce article detection signals, and said calculating means selects one of measuring sequences in accordance with the article detection signals, and calculates a weight of the article in accordance with the selected measuring sequence.

3. An apparatus for measuring weights of articles comprising:
   a conveying means for transporting articles successively and including a plurality of weighing conveyers for measuring weights of articles successively transported thereon to produce a plurality of weight signals;
   a calculating means for receiving the weight signals supplied from said plurality of weighing conveyers and calculating a weight of each of articles by processing said weight signals in accordance with a predetermined algorithm; and
   an article detecting means for detecting the successively transported articles to produce article detection signals and a transporting speed detecting means for detecting a travelling speed of articles successively transported on the conveying means to produce a travelling speed signal, and said calculating means detects a length of an article by processing said article detection signals and travelling speed signal, selects one or more weight signals in accordance with the detected length of the article, and calculates a weight of the article from the selected one or more weight signals.

4. An apparatus according to any one of claims 2 or 3, wherein said article detecting means comprises at least one photo-sensor.

5. An apparatus according to claim 1, wherein said plurality of weighing conveyers have different lengths viewed in an article transporting direction on the conveying means.

6. An apparatus according to claim 5, wherein said plurality of weighing conveyers are arranged in the order of lengths.

7. An apparatus for measuring weights and lengths of articles comprising:
   a conveying means for transporting articles successively along a transporting path and including a plurality of weighing conveyers arranged adjacently in series with the transporting path for measuring weights of articles successively transported thereon to produce a plurality of weight signals;
   a first calculating means for receiving the weight signals supplied from said plurality of weighing conveyers and calculating a weight of each of articles from said weight signals;
   at least two article detectors arranged with a predetermined reference length along said transporting path for detecting a passage of successive articles to produce article detection signals;
   a rotation angle detector for detecting rotation angles of driving rollers provided in said plurality of weighing conveyors to produce length signals; and
   a second calculating means for receiving said article detection signals supplied from said article detectors and said length signals supplied from said rotation angle detector, deriving a difference length between a length of an article and said reference length, and calculating a length of each of the articles based on said reference length and said difference length.

8. An apparatus according to claim 7, wherein said calculating means selects one of measuring sequences in accordance with said detected length of an article and calculates a weight of the article in accordance with the selected measuring sequence.

9. An apparatus according to 7, wherein said calculating means selects one or more weight signals in accordance with the detected length of the article, and calculates a weight of the article from the selected one or more weight signals.

10. An apparatus according to claim 7, wherein said article detecting means comprises at least one photo-sensor.

11. An apparatus according to claim 7, wherein said plurality of weighing conveyers have different lengths viewed in an article transporting direction on the conveying means.

12. An apparatus according to claim 11, wherein said plurality of weighing conveyers are arranged in the order of lengths.

13. An apparatus according to claim 7, wherein said rotation angle detecting means comprises a rotary encoder generating output pulses and at least two counters counting said output pulses in accordance with the article detection signals.

14. An apparatus according to claim 1, wherein said plurality of weighing conveyers have different lengths viewed in an article transporting direction on the conveying means.

15. An apparatus according to claim 14, wherein said plurality of weighing conveyers are arranged in an order of lengths.

* * * * *